Figure 1:
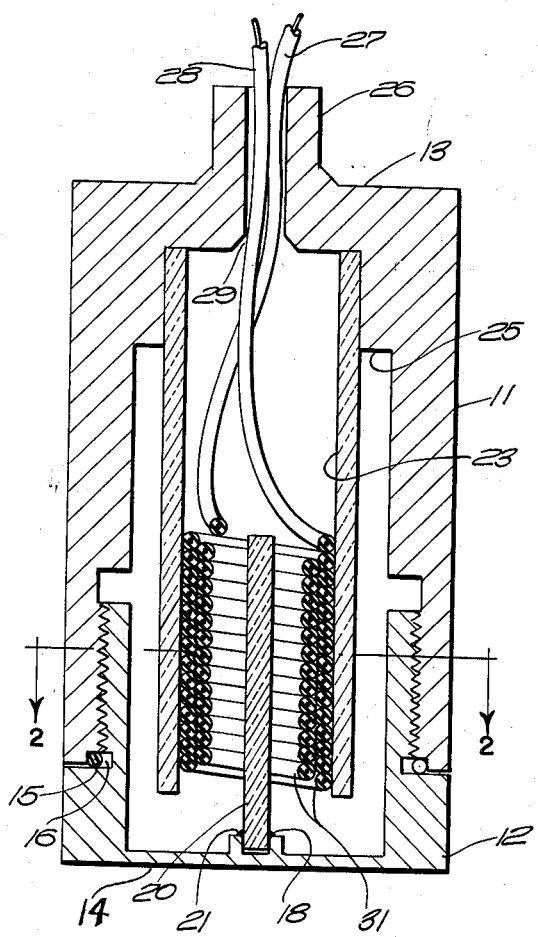

Aug. 20, 1963    D. R. CHURCH ET AL    3,101,422
ELECTROMECHANICAL TRANSDUCER APPARATUS
Filed Feb. 9, 1960

INVENTORS
DONALD R. CHURCH
JAMES DAROLD
BY
*Alfred H. Rosen*
ATTORNEY

United States Patent Office 3,101,422
Patented Aug. 20, 1963

3,101,422
ELECTROMECHANICAL TRANSDUCER
APPARATUS
Donald R. Church, Los Angeles, Calif., and James Da Rold, Glen Oaks, N.Y., assignors to Acoustica Associates, Inc., Plainview, N.Y., a corporation of New York
Filed Feb. 9, 1960, Ser. No. 7,576
4 Claims. (Cl. 310—26)

This invention relates in general to electromechanical transducer apparatus, and more particularly to such apparatus which is adapted for operation at elevated temperatures and pressures.

In the supervision or control of the height, level, or other characteristics of fluid in a container, by means of systems providing remote indication or control, it is necessary to provide a sensing element in or near the fluid which can reliably generate signals for use in the system. Systems exist employing float-operated sensing devices and switches, and more recently faster acting and more precise systems have been devised which employ electroacoustic sensing devices in electronic systems. An example of the latter more recent type of system is disclosed and claimed in the copending application of Robert L. Rod, Serial No. 585,889, filed May 18, 1956, now patent No. 2,990,543, and assigned to the same assignee as the present application. In some embodiments of such systems, an electromechanical transducer, of which the electrical impedance presented to a driving source of electric energy changes according to the acoustic impedance of the load on the transducer, is connected in circuit with a driving oscillator and with means to sense a change in its electrical impedance. Driving oscillator apparatus suitable for use in such systems is disclosed and claimed in the copending application of Martin A. Damast, Serial No. 656,293, filed May 1, 1957, now Patent No. 3,013,256, and assigned to the same assignee as the present application.

It is a general object of the present invention to improve electromechanical transducer apparatus intended for use as sensing elements in and with systems and circuits similar in purpose to those of Rod and Damast mentioned above, and for other purposes. A more specific object of the invention is to provide such improved transducer apparatus which is operable at higher temperatures and pressures than have heretofore been possible. A further object is to provide such apparatus which has improved sensitivity, is rugged and easy to manufacture and assemble, is made of components which are individually capable of withstanding rough handling and high temperatures, does not require the use of critical materials, and which can be fabricated according to known techniques. An additional object of the invention is to provide an improved transducer apparatus which can be assembled in a hermetically sealed manner, which when assembled will have no moving parts, will be completely safe in high explosive environments, operable at elevated pressures and in either electrically conductive or nonconductive liquids, and in corrosive liquids, and which can be disassembled for repair or modification and reassembled in the same manner as the original assembly.

In a typical embodiment of the invention, these objects are achieved by the provision of a two-part housing, made preferably of stainless steel, but which may be made of other suitable materials, which can be assembled to form a hermetically sealed explosion-proof and pressure resistant enclosure. The housing is most conveniently made of two hollow cylindrical pieces which telescopically interfit, desirably by means of cooperating inner and outer threads on their sides at confronting open ends. The remote ends of the two parts are closed, one by a diaphragm, the other by a wall on which a conduit tube is mounted externally of the housing, and the conduit tube communicates with the interior of the housing through a hole in that wall. An elongated electromechanical transducer, made in the form of a rod of a magnetic ferrite, is mounted at one end to the center of the diaphragm and projects axially therefrom within the housing toward the remote wall and the conduit opening. Preferably, the fundamental frequency of longitudinal vibration of this rod and the fundamental frequency of transverse vibration of the diaphragm are the same. A magnetic shielding tube made of a magnetic ferrite and preferably cylindrical in cross section is mounted at one end on the housing wall opposite the diaphragm and concentric with the conduit opening and extends therefrom toward the diaphragm a distance sufficient for the shielding tube to surround the major portion of the transducer element. The internal diameter of the shielding tube is greater than the external diameter of the transducer rod, and a coil of wire, intended for magnetostrictive cooperation with the transducer rod in the exchange of mechanical and electrical vibrations, is supported within the shielding tube in a position for such cooperation. Preferably, the coil is cemented to the inner wall of the shielding tube. Leads for driving signals and biasing current run from the coil through the conduit tube to the exterior of the housing, passing through any known conduit sealing element some distance from the housing proper.

The elements chosen for the foregoing configuration are preferably all capable of withstanding elevation temperatures in the range of 1000° F., the housing is capable of withstanding high pressures of the order of 2500 p.s.i. and corrosive liquids, and the entire assembly is capable of withstanding mechanical shock.

Figure 2:
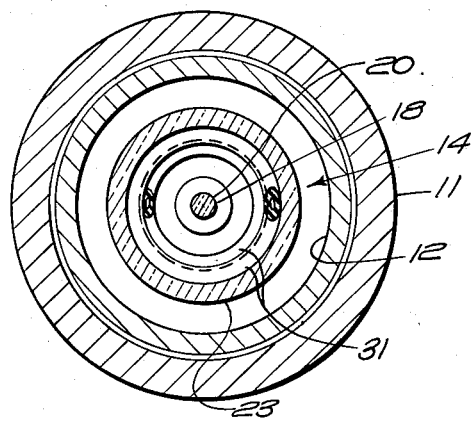

The foregoing and other objects and features of the invention are more fully set forth in the description of an embodiment of the invention which follows. This description refers to the accompanying drawing wherein:

FIG. 1 is a vertical section of transducer apparatus according to the invention; and FIG. 2 is a cross section along line 2—2 of FIG. 1.

Referring now to FIGS. 1 and 2, a housing for a transducer apparatus is made of two parts 11 and 12 of hollow cylindrical cross section. The first part 11 is closed at one end by a wall 13 and the second part 12 is closed at one end by a diaphragm 14. The open ends of the two parts of the housing confront and fit telescopically within each other. For this purpose the open end of the first part 11 is internally threaded while the wall of the second part 12 is externally threaded at the open end so that the two parts of the housing can be tightly assembled by threading them together. An O-ring 15 fits in a recess 16 provided at the inner extremity at the open end of the first part 11, and is compressed between the two housing parts 11 and 12 to provide a hermetic seal when the housing is assembled.

A socket 18 is provided at the center of the inner surface of the diaphragm 14, and an elongated magnetostrictive electromechanical transducer element 20, preferably made in the form of a rod of magnetic ferrite material, is mounted at one end in the socket and extends therefrom axially within the housing toward the end closure wall 13 of the first housing part 11. A suitable high-temperature cement 21, which may be any high-temperature ceramic cement, capable of withstanding temperatures in excess of 1000° F., is used to secure the transducer element 20 in the socket 18. A cylindrical magnetic shield 23, preferably made of a magnetic ferrite, is mounted in the first housing member 11 at the end closure wall 13, and extends parallel to the housing axis toward the diaphragm 14 a distance such that it surrounds the major portion of the transducer element 20. For the purpose of holding the shield rigidly adjacent the closure wall 13, the inner diameter of the first housing part 11 is reduced at a shoulder 25 near the closure wall 13 to a diameter equal substantially to the outer diameter of the shield, and the shield is forced at one end into the portion of reduced diameter between the shoulder 25 and the closure wall 13. A conduit 26 for electric wires 27 and 28 is mounted on the external surface of the end closure wall 13 of the first part 11 and communicates with the interior of the housing through an opening 29 in that wall. A coil 31 is mounted, preferably by means of a suitable high-temperature cement, on the inner wall of the shield 23 near the free end thereof confronting the diaphragm 14, in a position to cooperate with the transducer element 20, for the magnetostrictive interchange therewith of electrical oscillations and mechanical vibrations. The wires 27 and 28 are connected to this coil. A bushing (not shown) of any known suitable type may be used to provide a hermetically sealed passage for the wires from the conduit 26 at a location remote from the transducer assembly proper.

In order to provide the capability of operating at high temperatures it is preferable to make the housing parts 11 and 12 and the O-ring 15 of stainless steel. Any suitable magnetic ferrite can be used for the transducer element 20 and the shield 23; we have used a ferrite known as "Type B 4. 1/2/19-7B," made by Ferroxcube Corp. of America. The coil 31 is preferably made of a high temperature wire capable of withstanding temperatures in the range of 1600° F., and the leads 27 and 28 are brought out with sufficient length to be carried through the entire length of the conduit 26 which may extend through the wall of a tank, for example, in which the transducer assembly is to be used. With parts so chosen, the transducer assembly will be operative as long as the transducer element 20 is magnetostrictive. At temperatures above 1000° F., presently known magnetic ferrite materials tend to lose their magnetostrictive properties, but they enjoy the characteristic that even if they are heated to a temperature in excess of 1000° F., upon cooling below 1000° F., their magnetostrictive properties return. Thus the configuration illustrated in FIGS. 1 and 2 provides an electromechanical transducer assembly which is operative up to approximately 1000° F. and is not destroyed if that temperature is exceeded, but rather regains its operative characteristic when the temperature to which it is subjected is reduced below 1000° F. As is indicated above, the coil 31 can withstand temperatures in the range of 1600° F.

It should be understood that, as is generally described in the above-mentioned copending applications, the transducer apparatus of the invention, when used as a sensing device, is furnished with alternating electric energy through the leads 27 and 28 and is coupled to a circuit (not shown) which senses a change in the impedance of the transducer assembly in that circuit when the mechanical load on the transducer apparatus is changed, for example, from a gas to a liquid or solid fluid. The term "loaded-to-unloaded impedance ratio" as used herein means the ratio of the electrical impedances so sensed in the mechanically loaded and the unloaded conditions represented by a liquid or a solid fluid effectively in contact with the diaphragm 14, on the one hand and a gas effectively in contact with the diaphragm on the other hand, respectively.

When the assembly described above is in a gaseous medium, so that the diaphragm 14 is in contact with a gas, the transducer element 20 is free to vibrate, and acts as a relatively low impedance across the coil 31 when the latter is energized with electric energy at a suitable frequency. If the diaphragm 14 comes in contact with a liquid or a solid fluid, or is otherwise effectively loaded with a liquid or a solid fluid, its motion is damped, and it in turn dampens the motion of the transducer element 20, which then acts as a relatively high impedance across the coil 31, when the latter is so energized.

Preferably, the dimensions of the diaphragm 14 are such that it has the same transverse fundamental resonant frequency as the fundamental resonant frequency of the transducer element 20 in a longitudinal mode. Preferably, also, electric energy for the coil 31 is alternating at the same frequency. The transducer element 20 has a very high Q in the form of a free ferrite rod, and in that form it exhibits impedance-ratio ranges in excess of 50:1 from the loaded to the unloaded condition. The diaphragm 14, if made of steel (e.g., stainless steel) also has a relatively high Q. Accordingly, the impedance ratio of the complete assembly from the loaded to the unloaded condition is maximized with the transducer assembly so optimized (i.e., diaphragm transverse fundamental resonance and transducer element longitudinal fundamental resonance at the same frequency). In an assembly lacking such optimization, the high Q, due to a ferrite rod 20 alone, provides the complete assembly with a loaded-to-unloaded impedance ratio in excess of 10:1 at ambient temperatures. This ratio decreased to about 2:1 at about 1000° F.

The use of a diaphragm 14 which is much larger in area than the cross section of the transducer element 20 permits improved coupling to a fluid load and therefore provides improved loading of an elongated transducer such as the rod 20 which has a small cross section, a greater sensing area, and increased sensitivity of the assembly.

The above-described configuration of an embodiment of the invention permits unusually easy manufacture and assembly. If all the parts are essentially cylindrical, the cooperating parts, namely the transducer element 20 and the coil 31, can be mounted on separate housing parts 12 and 11, respectively, without ever having to touch each other, and can be brought into cooperating relation by merely screwing the two housing parts 11 and 12 together, and this action will simultaneously provide a hermetic seal through use of the O-ring 15, and thus an explosion-proof housing, which will also be pressure and corrosion resistant depending upon the materials chosen. The shield 23 which holds the coil 31 prevents the housing 11 and 12 from magnetically shorting the coil 31, which possibility has to be taken into consideration when the housing is made of stainless steel. If this shielding property is not required, as would be the case should the housing be made of a high impact, high temperature resistant plastic, for example, the tube 23 then could be made of some other material, for example, a high-temperature resistant and rigid plastic. It will be appreciated that the parts need not be cylindrical in cross section but might be rectangular, square or oval, or of complex cross-sectional form, if desired; in any of these latter cases, the two parts 11 and 12 of the housing can be held together by other suitable mechanical clamping means (not shown) rather than by screw threads as illustrated. Clearly, the assembly will operate in environments which are electrically conductive or nonconductive, as well as in explosive and/or corrosive environments, since the operating parts are completely shielded by the housing.

The transducer element 20 may be biased in the usual manner of biasing magnetostrictive elements by passing direct current through the coil 31 via the same leads 27 and 28 simultaneously with an alternating energizing current. The direct and alternating currents are readily isolated in the control units of systems in which the assembly is employed.

Some of the problems which are solved with the transducer apparatus illustrated in FIGS. 1 and 2 are:

(1) Placing a high-temperature coil on a ferrite rod without mechanically loading the rod by any element of the assembly itself—achieved by supporting the coil 31 on the shield tube 23 spaced from the rod 20;

(2) Shielding the coil to prevent magnetic shorting effects of a stainless steel housing—achieved simultaneously by making the tube 23 of magnetic material;

(3) Provision of an explosion-proof, corrosion resistant and high-temperature resistant housing which permits easy assembly and preserves the first two solutions; and (4) Provision of a high-temperature operating capability with useful sensitivity, and requiring no moving parts.

The embodiment of the invention which has been illustrated and described herein is but one illustration of the invention. Other embodiments and modifications will occur to those skilled in the art. No attempt has been made to illustrate all possible embodiments of the invention, but rather only to illustrate its principles and the best manner presently known to practice it. Therefore, while a specific embodiment has been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Electromechanical transducer apparatus, particularly adapted for operation at elevated temperatures and pressures, comprising a hermetically sealable rigid housing of magnetically permeable material having only first and second parts detachably connected together, said first part including an integral diaphragm portion forming one end wall of said housing, an elongated magnetostrictive transducer element made of a material which is operable in the temperature range of 1000° F. mounted at one end on the interior side of said diaphragm and having its other end free and extending therefrom into the space in said housing, a tubular magnetic shielding element mounted at one end on the inner surface of a wall of said second housing part opposite said diaphragm and having its other end free and extending therefrom toward said diaphragm a distance sufficient to surround the major portion of said transducer element, the inner diameter of said shielding element being greater than the outer dimensions of said transducer element, and a coil of wire having an internal diameter larger than said outer dimensions supported within said shielding element and extending along the major portion of the length of said transducer element in cooperative relation with said transducer element for the interchange therewith of electrical oscillations and mechanical vibrations, whereby the mating of said first and second parts provides a complete housing for said apparatus and locates said transducer element within but out of contact with said coil and said shielding element.

2. Electromechanical transducer apparatus, particularly adapted for operation at elevated temperatures and pressures, comprising a hermetically sealable rigid housing of magnetically permeable material having first and second hollow cylindrical parts each closed at one end and telescopically interfitting at their open ends, the end closure of the first part comprising an integral circular diaphragm, the end closure of the second part comprising a tubulation extending away from the center of said closure for the passage of wires to the interior of said housing through an opening in said closure, an elongated cylindrical magnetostrictive transducer element made of a material which is operable in the temperature range of 1000° F. mounted at one end on the center of the interior of said diaphragm and having its other end free and extending therefrom into the space in said housing, a tubular magnetic shielding element mounted at one end on the inner surface of said end closure of the second part substantially concentric with said tubulation and opening, and having its other end free and extending therefrom toward said diaphragm a distance sufficient to surround the major portion of said transducer element, the inner diameter of said shielding element being greater than the outer dimensions of said transducer element, a hollow coil of wire having an internal diameter larger than said outer dimensions supported within said shielding element and extending along the major portion of the length of said transducer element in cooperative relation with said transducer element for the interchange therewith of electrical oscillations and mechanical vibrations, whereby the mating of said first and second parts provides a complete housing for said apparatus and locates said transducer element within but out of contact with said coil and said shielding element, and wires leading from said coil through said tubulation to the exterior of said housing.

3. Apparatus according to claim 2 in which said first and second parts of said housing are threadedly interfitted.

4. Apparatus according to claim 3 in which said housing is made of a hard metal and an O-ring of the same metal is disposed between said first and second parts in a position to be compressed between them upon tightening of said parts on the screw threads thereof to provide an explosion-proof housing.

References Cited in the file of this patent

UNITED STATES PATENTS

| | | |
|---|---|---|
| 2,498,990 | Frylund | Feb. 28, 1950 |
| 2,534,276 | Lancor | Dec. 19, 1950 |
| 2,978,670 | Peek | Apr. 4, 1961 |
| 3,016,498 | Powell | Jan. 9, 1962 |